June 7, 1960  C. D. HAWKINS  2,939,419
LIQUID LEVEL SIGNALING DEVICE
Filed June 25, 1958  2 Sheets-Sheet 2
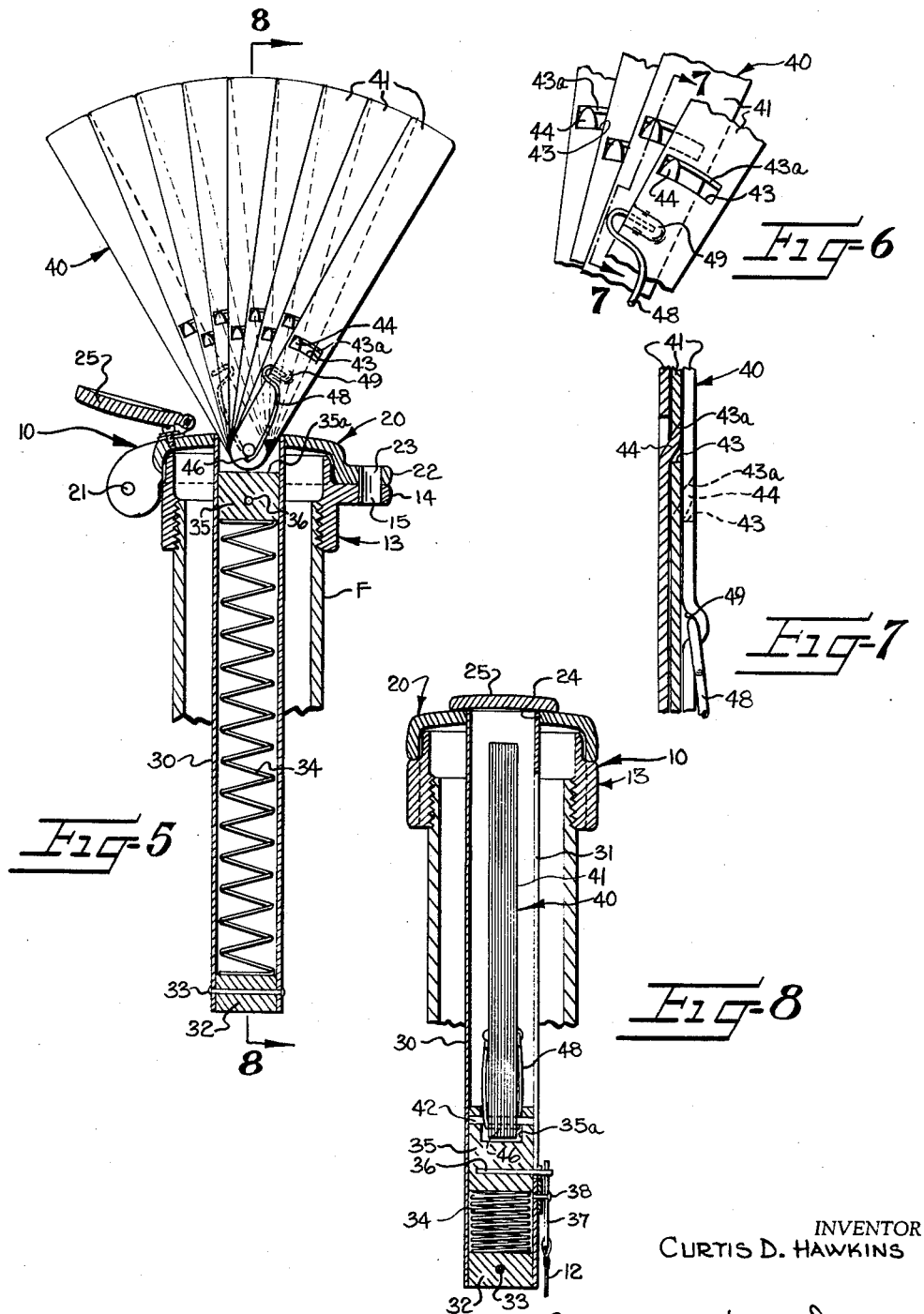
INVENTOR:
CURTIS D. HAWKINS
BY Eaton, Bell, Hunt & Seltzer
ATTORNEYS

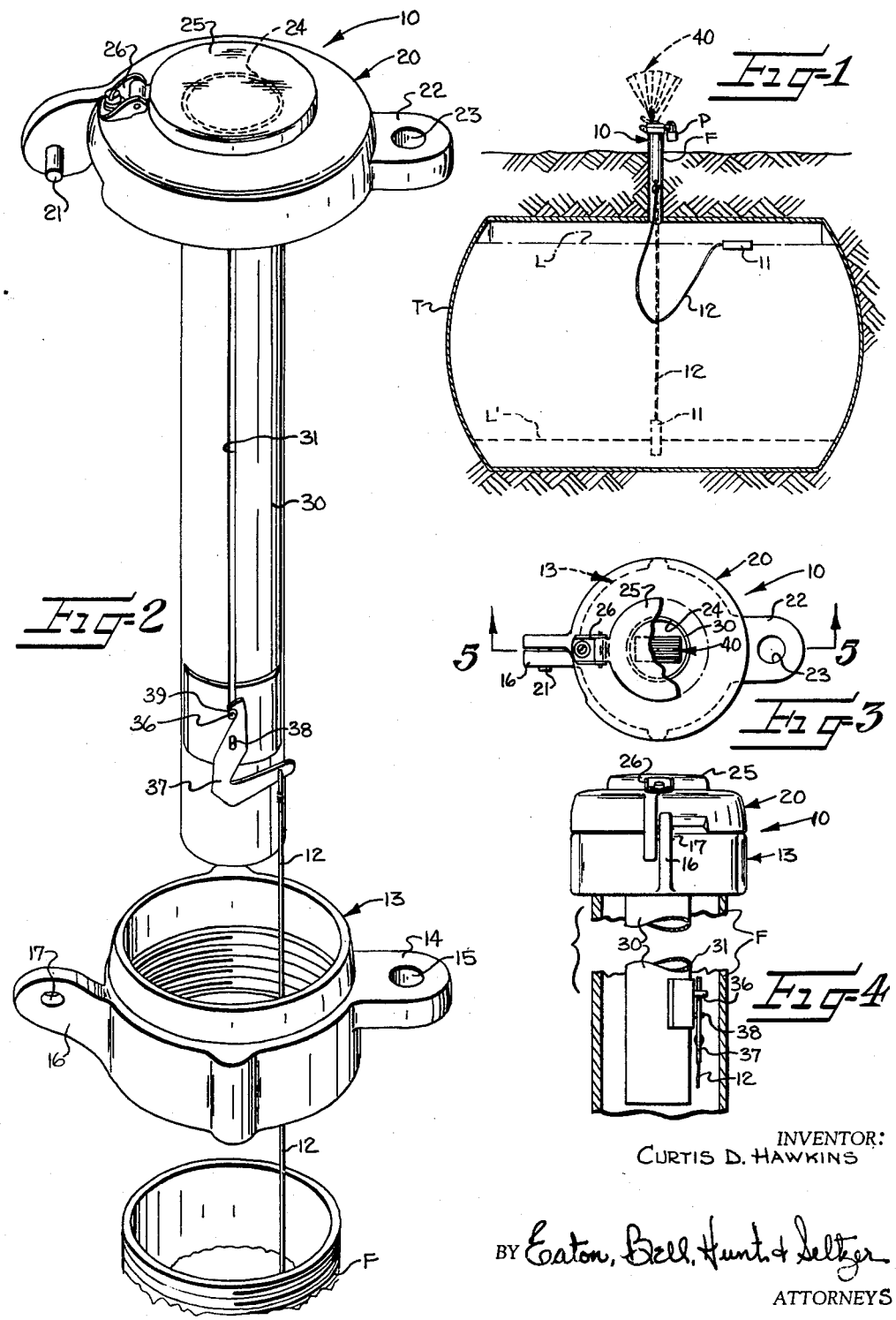

United States Patent Office 2,939,419
Patented June 7, 1960

2,939,419

LIQUID LEVEL SIGNALING DEVICE

Curtis D. Hawkins, Box 1010, Marion, N.C.

Filed June 25, 1958, Ser. No. 744,377

5 Claims. (Cl. 116—117)

This invention relates to signaling devices for use with tanks such as fuel tanks.

It is not uncommon, particularly during severe cold conditions, for home owners to run out of fuel oil without even realizing that their fuel supply had been dangerously low for a number of preceding days. It is to prevent this inconvenience and hardship and resulting expense in the event the furnace has been damaged by the sediment in the fuel tank that the present invention is particularly directed. This has been accomplished by providing a visual indicator which upon the fuel in the tank reaching a predetermined low point, is caused to be ejected outside of the filler or stand pipe, as the case may be, to permit the home owner to readily learn merely by a glance that it is time to replenish the fuel oil. In those cases where a home owner or commercial establishment, as the case might be, has contracted for a fuel company to maintain proper amounts of fuel oil in the tank at all times, the instant invention serves to permit the route man to merely determine at a glance whether or not the fuel supply needs to be replenished. In those cases where the fuel tank is positioned in the front of the residence or establishment and the view of the filler or stand pipe is unobstructed from the road, the route man would not have to stop if no fuel is indicated as being needed. Thus the time consuming operation of stopping at pre-scheduled points on the route is greatly reduced. Furthermore, the time consuming operation of checking the fuel level in the tank with a calibrated rod is eliminated.

Accordingly, the primary object of this invention is to provide visual indicating means which is normally hidden within the confines of the filler or stand pipe of a fuel tank, as the case may be, and upon the fuel in the tank becoming dangerously low, is caused to be ejected outside the confines of the filler pipe or stand pipe to readily be seen and serve its warning function.

Another object of this invention is to provide a visual indicator device which is so constructed that it may be placed on an ordinary stand or filler pipe in a matter of a few minutes and when in either inactive or active position, serves to prevent dirt or debris or the like from being positioned in the pipe by mischievous children, for example.

It is a further object of the invention to provide a visual indicator device for a filler pipe for a fuel tank wherein the device is constructed as a compact unit to permit the same to readily be removed from the opening of the filler pipe when fuel oil is to be replenished.

Some of the objects of the invention having been stated, other objects will become apparent from the following description when taken in connection with the accompanying drawings, in which—

Figure 1 is a vertical sectional view of the invention applied to a filler pipe of a submerged fuel tank;

Figure 2 is a greatly enlarged exploded view showing the signaling device and the manner in which the same is adapted to be positioned on the upper end of a filler pipe;

Figure 3 is an enlarged top plan view looking down on the filler pipe shown in Figure 1 with portions thereof broken away for clarity;

Figure 4 is an enlarged fragmentary elevational view of the upper end of the filler pipe shown in Figure 1 with the invention applied thereto with portions broken away for clarity;

Figure 5 is a fragmentary vertical sectional view taken along line 5—5 in Figure 3 and showing the upper end of the filler pipe of Figure 1 and showing the signaling device in extended active position;

Figure 6 is a fragmentary elevational view showing the particular manner that the blades forming the visual indicator are arranged and interconnected relative to each other for forming a fan-like signal;

Figure 7 is a fragmentary vertical sectional view taken along line 7—7 of Figure 6 and showing in detail the particular manner in which the blades interlock with each other;

Figure 8 is a fragmentary vertical sectional view similar to Figure 5 taken substantially along line 8—8 of Figure 5, but showing the visual indicator in inactive position and the manner in which the blades forming the indicator are positioned relative to each other.

Referring now more specifically to the drawings and particularly Figure 1, a tank T for containing fuel or the like is shown as being provided with a conventional filler pipe F in the upper end of which is positioned a visual indicator device designated broadly by reference numeral 10. It should be noted that the indicator device is provided with a float 11 connected to the lower end of a connector line 12 which is preferably in the form of piano wire with the upper end of the connector line 12 being secured to a trigger mechanism which will be described in greater detail later.

When the fuel level in the tank is ample as indicated by level line L, the connector line 12 for the float 11 is normally extending downwardly into the fuel in the form of a loop as shown in solid lines in Figure 1. Now, upon the level in the tank dropping to the point indicated by L', the float 11 is sufficiently exposed above the surface of the liquid therein to cause the weight of the float and the connector line 12 to trigger the indicating device and eject the signal in the form of a fan-like arrangement of blades upwardly as indicated in dotted lines in Figure 1.

Now referring more specifically to Figure 2, the manner in which the indicator device is positioned on the filler pipe F is shown. As shown, the filler pipe F is provided with suitable external threads on its upper end to permit an internally threaded collar 13 to be secured thereon. The collar 13 is provided at one side with an outwardly extending lug 14 having a vertical bore or aperature 15 therein which serves to receive a padlock P as shown in Figure 1. The remote side of the collar 13 from the lug 14 is provided with an ear-like member 16 with a horizontally disposed aperture or bore 17 therein which is adapted to be received by a pin 21 on a cover plate broadly indicated by reference numeral 20. The cover plate 20 is also provided with a lug 22 having an aperture or bore 23 therein to mate or coincide with the bore 15 on lug 14 of the collar 13 and for receiving the padlock P for preventing an unauthorized person from gaining access to the fuel supply. The cover plate 20 is also provided with a concentrically arranged opening 24 which is normally hidden from view by a cap 25 which is suitably pivotally mounted thereon by a bracket member 26.

An elongated cylinder or housing 30 has its upper end suitably secured as by a pressed fit, for example, in the opening 24 of the cover plate 20. The cylinder 30 is provided with an elongated relatively narrow slot 31 extending throughout a substantial portion of its length.

The lower end of the cylinder is closed by a plug 32 secured thereto by a pin 33, as best shown in Figure 5. A spiral compression spring 34 is positioned in the cylinder 30 with its lower end resting on the plug 32 and its upper end suitably secured to the underside of an annular signal support or base 35 having a pin 36 extending outwardly from one side thereof and penetrating the slot 31 in cylinder 30. The slot 31 thus serves to guide the support 35 during its vertical movement when the fanlike signal broadly indicated by reference numeral 40 which is suitably secured to the support 35 is moved from inactive to active position and vice versa.

The pin 36 also serves as the releasable means for normally holding the spring 34 in compressed and ready position as shown in Figure 8. For engaging and holding the pin 36, a trigger 37 is provided which is substantially L-shaped and is pivotally secured as at 38 to a reinforced area of the cylinder 30. As shown in Figure 2, the upper end of the connector line 12 for the float 11 is suitably secured to the outer lower end of the trigger 37 and the upper end of the trigger is provided with a notch 39 for engaging the pin 36.

As best shown in Figure 8, the support 35 for the fanlike signal 40 is provided with a transverse slot 35a in its upper end in which are positioned the lower ends of blade-like members 41 which are pivotally supported in juxtaposition by a pin 42 penetrating their lower ends. As shown in Figure 5, nine blade-like members 41 are provided which when in active position, as shown therein, serve to make a prominent signal which can readily be observed. If desired, and it would be preferred in most instances, the blades 41 may be painted a suitable brilliant color or formed of colored plastic to add to their prominence and visibility.

As best shown in Figures 5, 6 and 7, each of the blades 41 (with the exception of the remote end blade in Figure 5) is provided with a transverse slot 43 in which is received a tongue member 44 of an adjacent blade. Each of the tongues 44 is preferably formed by being punched or struck from each of the blades 41 after which they are suitably filed or ground to the desired shape. Each of the transverse slots 43 is defined on one side by a beveled edge 43a against which rides the free end of the corresponding tongue 44. This particular arrangement, as best shown in Figure 7, enables the tongues to serve to hold the blades together for sliding movement relative to each other. Also, the tongues 44 in conjunction with the ends of the transverse slots 43 serve as stops to control the degree that the blades 41 spread apart. As shown in Figure 5, the upper edges of the blades when in maximum spread apart relation are preferably slightly overlapping to permit the blades to readily be moved back to the inactive position when resetting the device.

It should be noted, however, that the front blade (Figure 5) which is on the outside of the stack of blades, is not provided with a tongue-like member 44. It should also be noted as shown in Figure 7 that the tongue members 44 positioned in the transverse slots 43 do not extend outwardly beyond the face of the blade to avoid interfering with the spreading apart of the blades when the same are ejected from the inactive position shown in Figure 8 to the active position shown in Figure 5. The transverse slots 43 and the tongues 44 are positioned in staggered relation to avoid interfering with the fan-like action of the blades in the event one of the tongues 44 should happen to protrude a slight distance outside of its corresponding slot 43 above the face of the blade 41.

For causing or effecting the spreading apart of the blades 41, each of the blades is provided with a small aperture or keyway in its lower end below the pivot pin 42, which small aperture 46 is penetrated by a substantially U-shaped spring 48 which has its opposite ends reversely bent as best shown in Figure 5 with the outermost ends of the springs being received in recesses 49 formed in the outermost blades 41.

The blades 41 of the signal device 40 are normally completely confined within the cylinder 30 beneath the cap 25 as shown in Figure 8 when the fuel level in the tank has not reached a predetermined low position. However, upon the level of the fuel in the tank reaching a predetermined low position as shown in dotted lines in Figure 1, the weight of the float 11 and the connector line 12 attached thereto will cause the trigger 37 to be pivoted downwardly thus releasing the pin 36 from the trigger 37 and thus permitting the compression spring 34 to eject the blades 41 upwardly against the lid 25 to flip the lid open and cause the blades under the action of the spring 48 to move to the spread apart fan-like position shown in Figure 5. In this position, the home owner or fuel oil service man can tell at a glance that the tank needs to be replenished.

It should be noted that although the lid 25 can readily be pivoted to open position when the signal device is in the inactive position as shown in Figure 8, substantially no trash or foreign matter may gain access to the fuel supply since the only opening to the fuel supply is the elongated slot 31 in the side wall of the cylinder 30. This slot 31 of course is so small that the amount of trash which might go through the same is negligible. When the signal device is in activated position as shown in Figure 5, the support 35 for the blades serves to fully close the open upper end of the cylinder 30 and thus completely seals the cylinder 30 to prevent any debris or the like from even passing through the narrow elongated slot 31 therein. Thus, it is apparent that the instant device is substantially foolproof from children and pranksters and the like when the cover plate 20 is padlocked to the collar 13.

It is also apparent that the cover plate 20 upon the padlock P being removed can readily be lifted to withdraw the cylinder 30 therewith from the confines of the fill pipe F to thus permit the fuel oil to be readily replenished.

It is thus seen that the instant invention although being simple in construction readily lends itself for long periods of use and readily serves to prevent a fuel tank from being exhausted of fuel while at the same time being so constructed that it is substantially foolproof to prevent foreign matter and debris and the like from gaining access to the fuel supply.

In the drawings and specification there has been set forth a preferred embodiment of the invention and, although specific terms are employed, they are used in a generic and descriptive sense only and not for purposes of limitation, the scope of the invention being defined in the claims.

I claim:

1. A device adapted to be mounted on a pipe of a fuel tank for indicating when the level of fuel in the tank has reached a predetermined low position, said device comprising a float, signal means adapted to be positioned in the fuel tank, releasable means for holding said signal means in inactive position until the fuel has reached a predetermined low level, a connector line having its opposite ends attached to said float and said holding means respectively, and means for ejecting the signal means to a visible position upon release of said holding means in response to a taut condition in said connector line when the float descends to the predetermined low level of fuel in the tank.

2. In a fuel tank having a pipe extending therefrom, the combination therewith of visual indicating means for determining when the supply of fuel in the tank has reached a predetermined low level, said visual indicating means comprising signal means normally being in inactive position within the pipe, a float positioned within the fuel tank, releasable means holding said signal means in inactive position within the pipe, a connector line having its opposite ends attached to said float and said releasable holding means respectively, and means for ejecting said signal means outside of the pipe upon release of said holding means in response to a taut condition in said connector line when said float descends to the predetermined low level of fuel in the tank.

3. A visual indicating device adapted to be positioned within a pipe of a fuel tank for indicating when the supply of fuel in the tank has reached a predetermined low level, said device comprising a float within the fuel tank, movable signal means positioned in the pipe, releasable means normally holding said signal means in inactive position within the pipe of the fuel tank, trigger means adapted to normally engage said releasable means, means for ejecting said signal means outside of the pipe upon said releasable means being released, and a connector line secured to said trigger means and said float and serving to actuate the trigger upon the fuel in the tank reaching a predetermined low level and causing the weight of the float to exert a pulling force on the trigger.

4. A visual indicating device adapted to be mounted on the pipe of a fuel tank for indicating when the level of the fuel in the tank has reached a predetermined low point, said device comprising a cover plate adapted to be positioned on the pipe of the fuel tank, said cover plate having an opening therein, a cap normally closing the opening in the cover plate, an elongated housing positioned in the opening in the cover plate, signal means normally confined within said housing, releasable means serving to hold said signal means within said housing, resilient means positioned below said signal means and serving to eject said signal means upwardly against said cap and through the opening in said cover plate upon said releasable means being released, trigger means for normally holding said releasable means in inactive position, and float means connected to said trigger means and adapted to actuate the same upon the float indicating that the fuel in the tank has reached a predetermined low position.

5. A device adapted to be mounted within a pipe of a fuel tank for indicating when the supply of fuel in the tank has reached a predetermined low level, said device comprising a cover plate adapted to be positioned on the pipe of the fuel tank, said cover plate having an opening therein, a cap normally closing the opening in said cover plate, an elongated housing positioned in the opening in said cover plate and extending downwardly therefrom, signal means normally confined within said housing, said housing being provided with an elongated slot extending lengthwise thereof, a pin extending laterally from the lower portion of said signal means through the slot in said housing, a trigger pivotally mounted on said housing, said trigger overlying and engaging said pin to releasably lock said signal means in a retracted position within said housing, compressed resilient means in said housing positioned below said signal means, a float for disposition in the fuel tank, a connector line attached to said float and to said trigger, and said trigger being pivoted to release it from locking engagement with said pin in response to a taut condition in said connector line when said float descends to the predetermined low level of fuel in the tank, said resilient means thereafter expanding to urge said signal means upwardly, and said signal means displacing said cap and passing through the opening in said cover plate to an extended visible position outside of said housing.

References Cited in the file of this patent
UNITED STATES PATENTS

| | | |
|---|---|---|
| 2,096,411 | St. John | Oct. 19, 1937 |
| 2,463,304 | Pick | Mar. 11, 1949 |

FOREIGN PATENTS

| | | |
|---|---|---|
| 166,503 | Germany | Dec. 23, 1905 |
| 245,103 | Great Britain | Aug. 5, 1926 |